Figure 1:
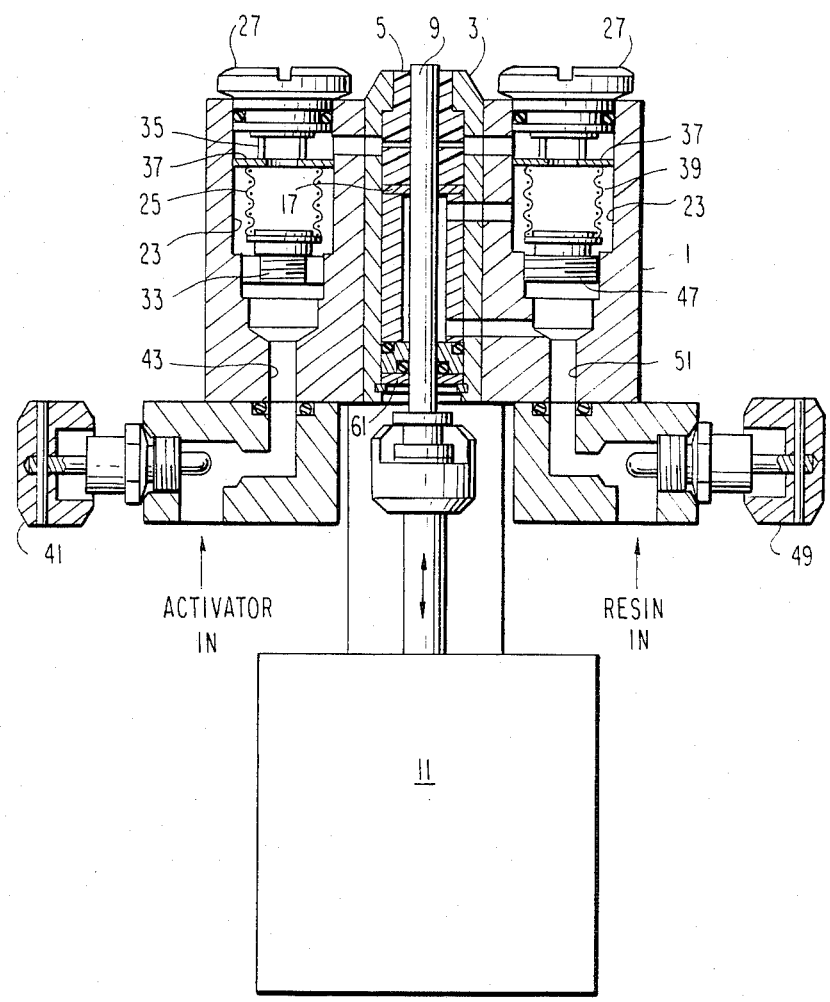

United States Patent [19]

Commette et al.

[11] Patent Number: 4,523,696

[45] Date of Patent: Jun. 18, 1985

[54] APPARATUS FOR DISPENSING A MIXTURE OF MUTUALLY REACTIVE LIQUIDS

[75] Inventors: Denis S. Commette, Mantoloking; Eugene R. LaMonica, Bricktown, both of N.J.

[73] Assignee: Gusmer Corporation, Lakewood, N.J.

[21] Appl. No.: 600,014

[22] Filed: Apr. 13, 1984

[51] Int. Cl.³ .................... B05B 7/04; B05B 15/02
[52] U.S. Cl. ................... 222/135; 222/145; 222/146; 222/149; 222/189; 239/113; 239/117
[58] Field of Search ............ 222/135, 145, 148, 149, 222/189; 239/113, 117, 118, 414; 137/625.4

[56] References Cited

U.S. PATENT DOCUMENTS

| | | |
|---|---|---|
| 2,584,973 | 2/1952 | Andermatt . |
| 2,958,471 | 11/1960 | Zippel ............................ 239/414 |
| 3,004,719 | 10/1961 | Pouppirt . |
| 3,027,096 | 3/1962 | Giordano ...................... 239/414 X |
| 3,334,817 | 8/1967 | Miller et al. . |
| 3,687,370 | 8/1972 | Sperry . |
| 3,786,990 | 1/1974 | Hagfors . |
| 3,876,145 | 4/1975 | Gusmer et al. . |
| 3,945,569 | 3/1976 | Sperry . |
| 3,964,731 | 6/1976 | Ernst . |
| 4,023,733 | 5/1977 | Sperry . |
| 4,053,283 | 10/1977 | Schneider et al. . |
| 4,126,399 | 11/1978 | Schneider et al. . |
| 4,175,874 | 11/1979 | Schneider . |
| 4,214,708 | 7/1980 | Lacchia . |
| 4,377,256 | 3/1983 | Commette et al. . |

FOREIGN PATENT DOCUMENTS 163640 1/1954 United Kingdom ............... 239/414

Primary Examiner—Joseph J. Rolla
Assistant Examiner—Frederick R. Handren
Attorney, Agent, or Firm—Young & Thompson

[57] ABSTRACT

Apparatus for dispensing a mixture of mutually reactive liquids, such as a resin and its hardener, comprises a gun head having a bore opening therethrough to define a mixing chamber. The mutually reactive liquids are fed along separate paths through the head and into the bore to mix in the bore and be dispensed through one end of the bore. A valving rod is reciprocable in the bore, between a forward position in which the valving rod seals the liquid inlets from each other and occupies the mixing chamber, and a rearward position in which the valving rod opens the mixing chamber and permits the flow of liquids into the mixing chamber. One of the liquids is fed along the outer surface of the valving rod in the retracted position of the valving rod and along most of the length of the valving rod which was disposed in the mixing chamber in the forward position of the valving rod. In this way, mixed liquids are washed from the valving rod by that one component, in the rearward position of the valving rod.

9 Claims, 2 Drawing Figures

APPARATUS FOR DISPENSING A MIXTURE OF MUTUALLY REACTIVE LIQUIDS

The present invention relates to apparatus for dispensing a mixture of mutually reactive liquids, for example a resin and its hardener. The apparatus of the present invention is of the general type of U.S. Pat. No. 4,377,256, the disclosure of which is incorporated herein by reference.

In such apparatus, as is well known, two components are introduced separately from spaced inlets into a cylindrical mixing chamber from which they are directly dispensed. A cylindrical rod having about the same external diameter as the internal diameter of the mixing chamber, moves forwardly and rearwardly in the mixing chamber, from a position to the rear of the spaced inlets, to a forward position in which the forward end of the rod is in or extends beyond the forward end of the mixing chamber. Movement of the rod to the rear position exposes the inlets to permit their respective liquids to flow into the mixing chamber and mix therein and be dispensed therefrom; whereas forward movement of the rod purges the mixed liquids from the chamber and closes the inlets against further inflow of the liquids. In the case of mutually reactive liquids such as the components of synthetic resins, this purging action is quite important, because it prevents the accumulation and solidification of cured synthetic resin within the equipment, and so prevents the equipment from becoming plugged and stuck with hardened resin.

Despite many advances in this field, of which those of the above-identified patent were surely among the most notable, a certain problem has continued to plague such equipment. Specifically, it has proven to be impossible to keep the sides of the forward portion of the valving rod entirely free from mixed liquid, with the result that not only does a reactive layer of mixed liquid tend to build up on the sides of the forward portion of the rod, but also this mixed liquid is dragged backward when the rod is in its rearmost position, and is deposited in portions of the gun to the rear of the mixing chamber, where the mixed liquids solidify and cause a troublesome build-up of solid cured resin.

Some such devices provide an annular scraper at the rear of the mixing chamber, which closely surrounds the valving rod, and mechanically scrapes off as much as possible of what would otherwise be the adherent layer of mixed reactive material. However, such scrapers have not been wholly effective; for either they so closely surround the valving rod as to interfere with the free reciprocation of the valving rod, or else they have sufficient clearance to permit free movement of the valving rod, which clearance also permits mixed reactive material to be dragged rearwardly of the scraper.

A second problem that can arise in apparatus of this type is related to the first problem but arises when the valving rod is in its forwardmost position, that is, when the apparatus is at rest. At that time, the inlets of the liquids will be separated from each other by the valving rod; but the liquids in those inlets may still be under substantial pressure. This residual pressure tends to force small quantities of the liquid to migrate about and along the valving rod and rearwardly past the scraper, where they foul or even clog the interior of the apparatus.

One way to reduce such migration, is to provide an interference fit between the valving rod and the mixing chamber. This can be done in either one of two ways: in one of these ways, at least one of the valving rod and the mixing chamber can have at least its surface comprised of a deformable material such as a low-friction plastic, and the parts in their undeformed condition can have an interference fit so that the plastic is deformed upon advance of the valving rod. In the other of these ways, as in the above-identified patent, the mixing chamber is made of deformable plastic and is compressed axially so that it presses against the valving rod with a greater sealing effect than would be the case if such axial pressure were not applied.

But such an interference fit between the valving rod and the side walls of the mixing chamber is bought at a price: the free forward and rearward movement of the valving rod is correspondingly impeded.

A third problem arises when the device is in operation and the valving rod is retracted to its rearmost position. At that point, in order to keep the axial length of the gun to a minimum, the forward end of the valving rod is spaced only a short distance in front of the scraper. This means that there will be very little seal between the rear of the chamber and the tip of the valving rod. Mixed material in the mixing chamber, although under very low pressure because the forward end of the mixing chamber is open, will nevertheless tend to migrate rearwardly past the ineffective seal offered by the parts in this position, with the undesirable results mentioned above.

Accordingly, it is an object of the present invention to provide such equipment, which avoids difficulties arising from mixed reactive liquids that are dragged rearwardly through the scraper by the valving rod.

Another object of the present invention is to provide such equipment, in which what would otherwise be the harmful effect of the migration of liquids along the valving rod to the rear of the mixing chamber, when the equipment is not in use, is overcome.

It is a still further object of the present invention to provide an augmented seal between the valving rod and the scraper when the valving rod is in its rearmost position.

Finally, it is an object of the present invention to provide such equipment, which will be relatively simple and inexpensive to manufacture, easy to assemble, disassemble, operate, maintain and repair, and rugged and durable in use.

Figure 2:
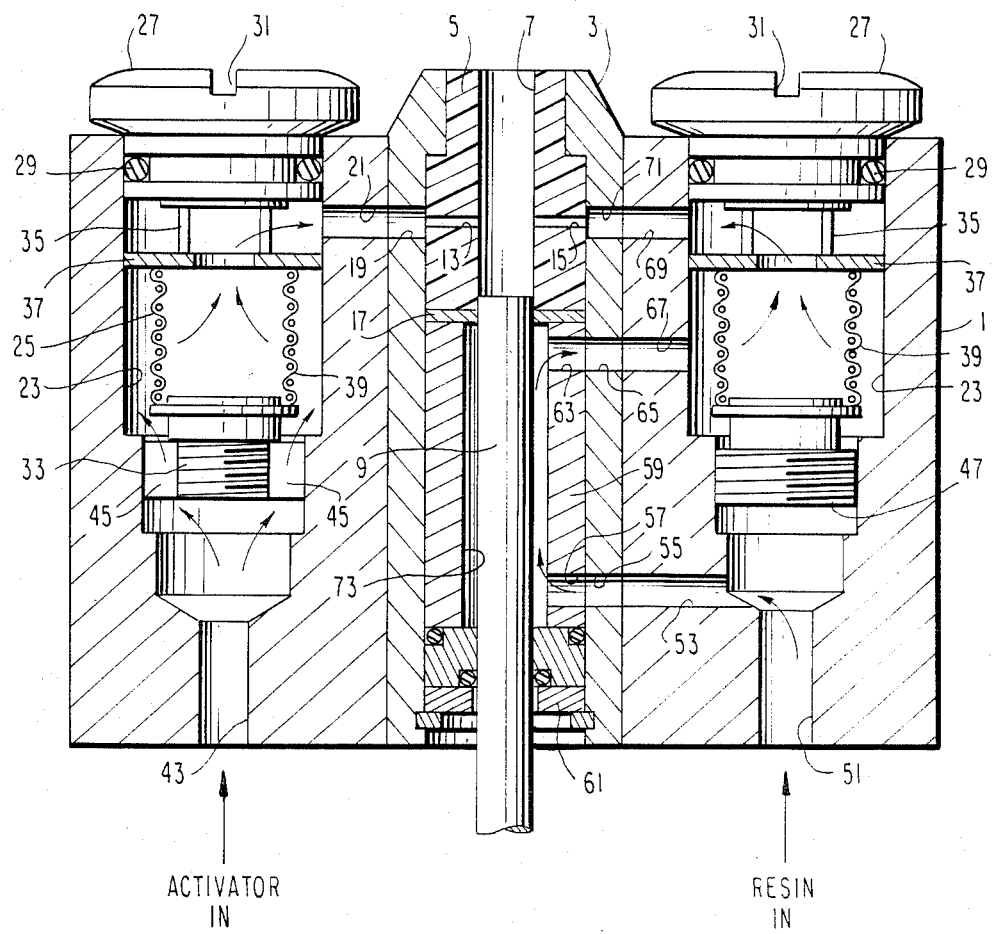

Other objects and advantages of the present invention will become apparent from a consideration of the following description, taken in connection with the accompanying drawings, in which:

FIG. 1 is a somewhat schematic overall plan view of apparatus according to the present invention, with the apparatus in its inactive or non-dispensing condition, that is, with the valving rod in its forwardmost position; and FIG. 2 is an enlarged view of the gun block as seen in FIG. 1, with the parts in their active or dispensing position, that is, with the valving rod retracted.

Referring now to the drawings in greater detail, and first to FIG. 1, the overall arrangement of the present invention can be quickly understood if it is considered that the illustrated embodiment is in the form of what is called in this art a "pour gun" for dispensing a foaming mixture of resin and hardening agent for the resin. Such guns are useful inter alia in packaging and in applying insulation material, and are characterized in that they dispense a continuous stream of material, in contrast to a dispenser of the spray gun type from which discrete particles are ejected.

As seen in FIG. 1, therefore, the gun of the present invention comprises a dispensing head 1 in which is disposed a generally hollow cylindrical chamber case 3 containing at its forward end a packing 5 in the form of a sleeve of elastically deformable low-friction plastic, such as polytetrafluoroethylene. Packing 5 has an axial bore 7 therethrough which defines a cylindrical mixing chamber. A valving rod 9 is reciprocable axially in bore 7 by a motor 11. The means for reciprocating valving rod 9 axially under the control of the operator are entirely conventional and so need not be further described.

Turning now to the more detailed view of FIG. 2, it will be seen that ports 13 and 15 of relatively small diameter are drilled through packing 5. Port 13 is the inlet for an activator; whilst port 15 is the inlet for a resin to be mixed with the activator. The resin can for example be a urethane resin, and the activator an isocyanate hardener therefor. Ports 13 and 15 are disposed at the same axial distance along bore 7 but are spaced apart preferably 120° peripherally of bore 7. They are shown in the same plane in the drawings only for convenience of illustration.

Although packing 5 is shown to be in one piece, it can if desired be in two pieces that are cemented together along a plane perpendicular to the axis of packing 5 and disposed slightly forward of ports 13 and 15. In that case, the packing forward of that plane can be of polytetrafluoroethylene, whilst the packing rearward of that plane can be of polychlorotrifluoroethylene. The former material imparts good lubricity; whilst the latter material resists cold flow and so maintains the desired size of ports 13 and 15.

Rearwardly of the packing 5 is an annular scraper 17 that surrounds valving rod 9 with as little clearance as possible, thereby to scrape as much as possible of the liquid from the surface of the valving rod upon retraction of the valving rod to the FIG. 2 position, in which the ports 13 and 15 are exposed and feed their respective liquids into the mixing chamber whence the hardening mixture is dispensed.

The activator inlet port 13 is fed by a port 19 through case 3, which in turn is fed through a port 21 in block 1 which is the outlet from a chamber 23 in block 1. Chamber 23 contains a screen unit 25 that includes a head 27 that slides into the outer end of chamber 23 and is sealed therein by an O-ring 29. A transverse slot 31 in head 27 permits securement of screen unit 25 in chamber 23 by screwing a screw-threaded end 33 of screen unit 25 into corresponding female threads in the adjacent portion of the side walls of chamber 23.

Screen unit 25 also comprises a cage 35 which includes an annular washer 37 whose outer periphery seals against the side walls of chamber 23. A cylindrical screen 39 is supported on cage 35 and extends between washer 37 and end 33.

The feed of activator to chamber 23 is via a manually actuated activator shut-off valve 41 (FIG. 1), and thence through an inlet port 43 in block 1 which is disposed axially of chamber 23. The inflowing activator then passes the screw threads on screw-threaded end 33, which for this purpose are cut away at a plurality of peripherally spaced points indicated at 45. Activator then flows from the space in chamber 23 surrounding screen 39, through screen 39 and through the interior of washer 37, thence out of cage 35 and through ports 21 and 19 and 13, in that order, and into the mixing chamber.

On the resin side, which is the right-hand side of the drawings, the flow path is not the same. A similar screen unit is provided; but the screw-threaded end 47, unlike the screw-threaded end 33, is uninterrupted and so, when in place, completely blocks the two axially spaced portions of the resin chamber 23 from each other.

Thus, the path of the resin through the gun is via manually-operated resin shut-off valve 49 (FIG. 1) into port 51 in gun block 1, but not yet through chamber 23, because of the imperforate screw-threaded end 47 which blocks the passage. Instead, the incoming resin is diverted through a port 53 in gun block 1, a port 55 in case 3, and through an inlet port 57 in a cylindrical sleeve 59 disposed in case 3 concentrically with but to the rear of scraper 17 and abutting scraper 17. Sleeve 59 is removably held in place in gun block 1 by a packing and cirlcip assembly 61.

In the interior of sleeve 59, the resin then flows forwardly, that is, upwardly as seen in the drawings, to a point as close as possible to scraper 17, and exits from sleeve 59 via a port 63, whence it flows through a port 65 in case 3 and a port 67 which comprises the inlet port to the corresponding chamber 23. Then, and only then, is the resin in a position to pass through the corresponding screen 39 to the interior thereof, and flow through the corresponding washer 37, out of the corresponding cage 35 and pass via port 69 in head 1 and port 71 in case 3 to the resin inlet port 15 in packing 5, and thence into the mixing chamber.

To permit the flow of resin through sleeve 59 in this manner, sleeve 59 is provided with a second axial bore 73 to the rear of the first bore 7 and of a diameter larger than the diameter of valving rod 9. Bore 73 is coaxial with valving rod 9, so that there is an annular cylindrical space, several times longer than its total diameter, between ports 57 and 63 of sleeve 59. Preferably, the cross-sectional area of bore 73 surrounding valving rod 9 is no greater than, and more preferably is substantially less than, the cross-sectional area of bore 7.

The resin thus flows forwardly through bore 73, with a velocity that varies inversely as the cross-sectional area of the annular free space between the side walls of bore 73 and the valving rod 9. Thus, if, for example, sleeve 59 has an outside diameter of 0.500 inch and an inside diameter of 0.250 inch, and valving rod 9 has an outside diameter of 0.149 inch, then the cross-sectional area of the free space between the interior of bore 73 and the exterior of valving rod 9 will be 0.0264 square inch. In that case, for a typical flow rate of resin of about 1 cubic inch per second, the velocity of the resin moving forwardly through bore 73 is about 3 feet per second; and this has proven to be a very suitable velocity for cleaning the retracted valving rod 9.

As will be appreciated from a comparison of FIGS. 1 and 2, the resin moves forwardly in bore 73 with this velocity, only when the parts are in the FIG. 2 position, that is, only when the valving rod is retracted. In this retracted position, the forward end of the valving rod is as close as practical to the scraper 17, and may for example be spaced perhaps 1/16 of an inch in advance of scraper 17. All the rest of the forward end of valving rod 9, which had been in contact with the side walls of packing 5 and which had passed through scraper 17 with more or less removal of mixed reactive liquid from the surface thereof, is now disposed in bore 73 and is washed by the rapidly forwardly moving resin. For this purpose, bore 73 is somewhat longer than the stroke of valving rod 9.

This rapid forward movement of the resin has two results, as follows:

1. As the resin is of course a solvent for the resin-activator mixture, the flow of resin tends to dissolve the mixture that has been dragged back behind the scraper by the valving rod; and 2. The mechanical action of the forwardly moving resin sweeps the mixture off the surface of the valving rod and carries it downstream into the resin inlet.

Of course, the amount of mixture thus removed by the rapidly flowing resin, has no adverse effect on what would otherwise be a stream of pure resin: even upon subsequent shutdown of the gun, the amount of activator that remains between bore 73 and resin inlet 15 is so highly diluted by the resin as not even to change noticably the viscosity of the resin upon subsequent standing of the gun for a long period of non-use.

But as indicated above, the bore 73 performs a novel and useful function not only in the dynamic condition of the gun of FIG. 2, but also in the static condition of the gun as shown in FIG. 1, namely, when the valving rod 9 is in its forwardmost position and nothing is dispensed from the gun. In that latter condition, as previously indicated, the liquids can still be under a certain residual pressure which would tend to make them creep about the valving rod in a thin film that spreads both forwardly and rearwardly from the activator and resin inlets 13 and 15. But the present invention prevents this creep from spreading undesirably rearwardly, because the resin in bore 73, although static, is nevertheless under a pressure at least as high as the pressure in resin inlet 15, so that there is no region of lower pressure to the rear, toward which liquids from inlets 13 and 15 could creep. In this way, the second problem identified above is solved.

Although the valving rod 9 is in its rearmost position as shown in FIG. 2, in which there is almost no seal between the open mixing chamber and the interior of the gun rearwardly of scraper 17, nevertheless, there is no tendency of the mixed liquids to leak rearwardly past scraper 17 at this time, because the pressure in bore 73 is at that time much higher than the pressure in the open mixing chamber. Inlet ports 13 and 15 are quite narrow and impose a very great pressure drop, typically 150 to 200 psi but which can be as much as 800 psi, between the liquids upstream and downstream thereof. If the pressure in the open mixing chamber in the position of the parts shown in FIG. 2 is taken to be, say, atmospheric, then it will be seen that up to 800 psi on the resin in bore 73 tends to force this resin forwardly past scraper 17 at a flow rate which, on the one hand, is not sufficient noticeably to alter the proportion of the activator and the resin, but which on the other hand is quite sufficient to ensure that no mixed liquid will flow rearwardly in the FIG. 2 position of the parts. In this way, the third problem identified above is solved.

In operation, the shut-off valves 41 and 49 are opened, thereby to open the liquid pathways previously described, to the supply of activator and resin from conventional separate sources thereof under pressure (not shown). To dispense mixed liquids, the motor 11 is actuated by conventional means (not shown) to withdraw the valving rod from the FIG. 1 position to the FIG. 2 position. Resin and actuator under pressure enter the mixing chamber thus established and mix therein and are dispensed from the open end thereof. As previously indicated, the activator proceeds directly through its screen 39; but the resin is detoured upstream of screen 39, to pass at high forward velocity through bore 73 on its way to its screen 39 and thence to the mixing chamber. Actuation of the motor 11 in the opposite direction moves valving rod 9 forwardly from the FIG. 2 position to the FIG. 1 position, thereby to expel remaining mixed liquid from the mixing chamber and to complete the dispensing operation.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in the art will readily understand. For example, the arrangement shown in the drawings includes a separate sleeve 59 inserted from the rear and removably held in place by the assembly 61. Alternatively, of course, sleeve 59 could be eliminated by providing a corresponding bore either in case 3, or if case 3 is eliminated, in gun head 1 itself. In that case, scraper 17 and packing 5 would be assembled from the front instead of from the rear.

These and other modifications and variations are considered to be within the purview and scope of the present invention as defined by the appended claims.

What is claimed is:

1. In apparatus for dispensing a mixture of mutually reactive liquids, comprising a gun head having a bore opening therethrough to define a cylindrical mixing chamber, means to deliver mutually reactive liquids along separate paths through said head and into said bore to mix in said bore and be dispensed through one end of said bore, a cylindrical valving rod reciprocable in the bore between a forward position in which the valving rod seals the liquid delivery means from each other and occupies the mixing chamber, and a rearward position in which the valving rod opens the mixing chamber and permits the flow of said liquids into the mixing chamber, the rod sliding in sealing relationship with the side walls of the mixing chamber in all positions of the rod in the mixing chamber; the improvement comprising means to feed one of said liquids along the outer surface of the valving rod in said retracted position of the valving rod and along most of the length of the valving rod which was disposed in the mixing chamber in said forward position of the valving rod, the forward end of the valving rod being disposed in said bore and isolating the mixing chamber from said means to feed one of said liquids in said retracted position of the valving rod, said separate path of said one liquid bypassing the forward end of the retracted valving rod so that said one liquid leaves the outer surface of the valving rod rearwardly of said forward end thereof and enters the mixing chamber forwardly of said forward end of the valving rod in said retracted position of the valving rod.

2. Apparatus as claimed in claim 1, the last-named means comprising a second bore into which most of said length of the valving rod is retracted in said retracted position of the valving rod, said second bore being coaxial with the valving rod and having an inner diameter substantially greater than the outer diameter of the valving rod, means for introducing said one liquid into one end of said second bore and for removing said one liquid from the other end of said second bore whereby said one liquid flows in an axial direction along the outer surface of most of said length of the valving rod.

3. Apparatus as claimed in claim 2, in which said one end of said second bore is remote from the mixing chamber and said other end of said second bore is closely adjacent the mixing chamber, said one liquid flowing through said second bore in a direction toward the mixing chamber.

4. Apparatus as claimed in claim 2, and means establishing a substantial pressure drop between said second bore and said mixing chamber when said valving rod is in said retracted position with the pressure in said second bore substantially higher than that in the mixing chamber.

5. Apparatus as claimed in claim 1, and an annular scraper closely surrounding the valving rod at the rear of the mixing chamber.

6. Apparatus as claimed in claim 2, and an annular scraper closely surrounding the valving rod at the rear of the mixing chamber, said second bore terminating at said scraper at the end of said second bore adjacent the mixing chamber.

7. Apparatus as claimed in claim 2, in which the cross-sectional area of said second bore surrounding said valving rod is no greater than that of the mixing chamber.

8. Apparatus as claimed in claim 2, the gun head having two screen chambers therein one individual to each of the liquids to be mixed, and a screen unit in each screen chamber to screen each liquid before the liquid reaches the mixing chamber, each screen unit having a screw-threaded inner end by which the screen unit is removably secured in the head, the screw-threaded end for said one liquid sealingly dividing the associated said screen chamber into two portions one of which communicates with one end of said second bore and the other of which communicates with the other end of said second bore, said one liquid flowing first into said one portion, then into said one end of said second bore, through said second bore and out said other end of said second bore into said other portion of said screen chamber, through said screen for said one liquid and then into the mixing chamber.

9. Apparatus as claimed in claim 8, the screw threads of said screen unit for the other said liquid being interrupted to permit flow past said screw-threaded inner end thereof.

* * * * *